United States Patent Office 2,782,802
Patented Feb. 26, 1957

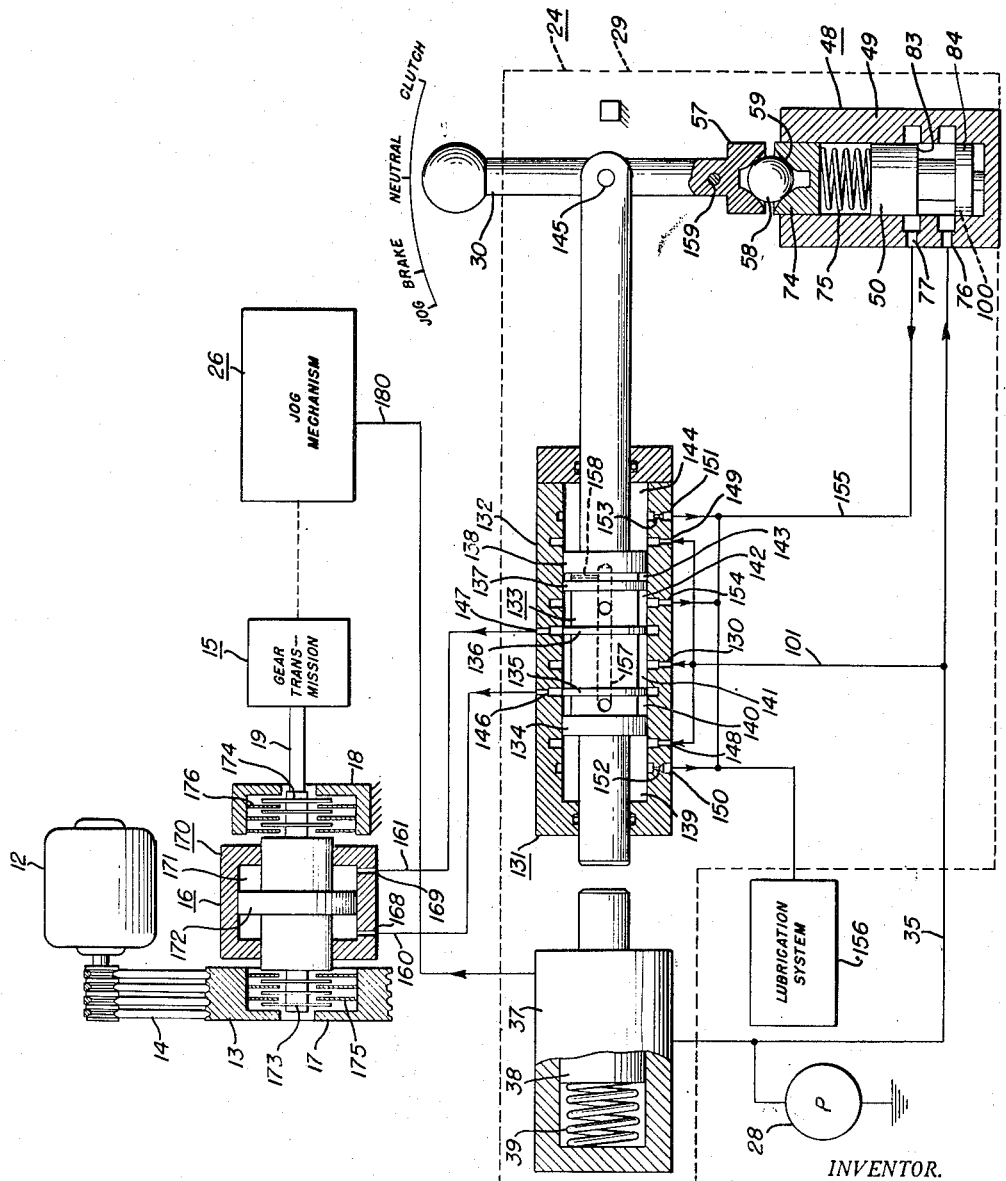

2,782,802
HYDRAULIC CONTROL SYSTEM

Bernard Sassen, Sidney, Ohio, assignor to The Monarch Machine Tool Company

Application May 12, 1951, Serial No. 226,073

1 Claim. (Cl. 137—621)

The invention relates in general to hydraulic control systems and more particularly to the construction of hydraulic valves.

The hydraulic control system is shown as including two separate valves, one of which selectively controls the flow of fluid to opposite sides of a piston and cylinder type of servomotor, and the other of these valves controls the amount of pressure which is applied to this servomotor. In the hydraulic circuit shown, these two valves are connected in parallel to a source of fluid pressure with the pressure control valve being in the form of a pressure regulating valve which has a spring that is compressible in a linear manner by a manually operable lever. This lever has a neutral position wherein the spring is not compressed and hence the fluid drains freely to a sump or other receptor of low back pressure. The selector valve is connected to the pressure source but since, when the lever is in the neutral position, the fluid drains in the sump, there is no fluid pressure on the selector valve. The selector valve and the pressure regulating valve are both controlled by the same lever so that as the lever is moved to linearly increase the pressure on the spring and hence increase the fluid pressure, the selector valve is moved to direct fluid to one side or the other of the servomotor. Further the valve system is provided with hydraulic detents so that the selector valve may be held in either of the selected operative positions.

An object of the invention is to provide a hydraulic valve having a movable element wherein hydraulic detents are provided to hold the valve in a selected position.

Another object of the invention is to provide a hydraulic valve of the axially reciprocable type wherein a neutral position is provided and is disposed centrally relative to two alternative positions and wherein the valve may be held in either of these alternative positions by hydraulic detents.

Another object of the invention is to provide a hydraulic detent for a fluid valve wherein the valve is held in a selected position by differential fluid pressure.

Still another object of the invention is to provide a hydraulic valve with lands to selectively block off fluid passage to an outlet and wherein the outlet has a restricted orifice so that when one outlet is blocked off, a differential pressure is built up to hold the movable element of the valve in a selected position.

Still another object of the invention is to provide a hydraulic valve which will provide a linearly varying resistance.

Another object of the invention is to provide a variable resistance valve which may be moved to variably restrict the passage of hydraulic fluid between an inlet and an outlet so that a linearly varying change of flow may be effected.

Another object of the invention is to provide a combined variable resistance valve and a drive control valve so that the two valves may be actuated simultaneously to obtain a linearly varying increase of pressure of fluid through the valve and operable upon a clutch and brake mechanism to control the clutch or brake pressure.

Still another object of the invention is to provide a hydraulic detent in the drive control valve so that no mechanical detent is needed and hence no false feel of pressure is transmitted through the clutch control lever to the operator.

Another object of the invention is to provide valve means which effects a linearly variable fluid pressure by means of a compressible spring and wherein this valve means has at least one chamber with a restricted orifice to provide a hydraulic detent so that the movable element of the valve means may be held in an operative position.

Other objects and a fuller understanding of the invention may be had by referring to the following description and claim, taken in conjunction with the accompanying drawing, in which the single figure of the drawing shows a schematic diagram of a hydraulic control circuit with a typical clutch and brake assembly to be controlled.

The figure of the drawing shows a hydraulic control system 24 which may be used to control many forms of mechanical devices. For purposes of illustration, the hydraulic control system has been shown as controlling a friction mechanism 16 by means of a jog mechanism 26 and a drive control mechanism 29. The friction mechanism includes a clutch 17 and a brake 18. An electric motor 12 is shown as driving a pulley 13 through a belt drive 14. A utilization device such as a gear transmission is shown at 15. This transmission has an input shaft 19 driven from the friction device 16. The drive control mechanism 29 is supplied with hydraulic fluid under pressure from a pump 28. The pump 28 has an outlet conduit 35 which supplies fluid under pressure to a variable restriction valve 48. This valve has a valve body 49 and a valve spool 50. The valve spool 50 is actuated by a drive control lever 30. The lever 30 is pivoted at 159 and has a fork 57 just below the pivot 159. The fork 57 acts on a ball 58 which in turn acts on a second fork 59 carried by a piston 74. The piston is slidable in the valve body 49 and acts on a compression spring 75. The compression spring 75 acts on the valve spool 50 to urge it downwardly. The valve body 49 has an inlet 76 and an outlet 77. The inlet 76 is connected to the conduit 35. The valve spool 50 has a land portion 83. A second land 84 is provided on the valve spool 50, and this land contains a restricted orifice 100. The outlet 77 is connected by a conduit 155 to a device of low back pressure such as a lubrication system 156 of the gear transmission 15.

A branch conduit 101 is connected to the conduit 35 and supplies fluid under pressure to the inlet 130 of a drive control valve 131. This drive control valve 131 has a valve body 132 and an axially reciprocable valve spool 133 therein. The valve spool 133 has first, second, third, fourth, and fifth lands 134, 135, 136, 137, and 138, respectively. These lands form with the valve body 132 first, second, third, fourth, fifth, and sixth chambers 139, 140, 141, 142, 143, and 144, respectively. The valve spool 133 is connected to the drive control lever 30 by the pivot connection 145. Thus, the lever 30 is able to control the axial position of the valve spool 133. First and second outlets 146 and 147 are provided in the valve body 132. Detent inlets 148 and 149 are provided into the chambers 139 and 144 in parallel with the inlet 130. Detent outlets 150 and 151 are provided from the chambers 139 and 144. Restricted orifices 152 and 153 are connected to the outlets 150 and 151 respectively. The chambers 139 and 144 with the associated outlets and restricted orifices constitute a form of hydraulic detent. A main outlet 154 is provided in the valve body 132, and normally is in communication with the fourth chamber 142. The three outlets 150, 151, and 154 are connected together to the outlet conduit 155. An outlet passageway 157 is generally axial relative to the valve spool 133 and connects the second chamber 140 and the fourth chamber 142. This outlet passageway 157 is also connected to the fifth chamber 143 through the restricted orifice 158.

The drive control lever 30 is pivoted at 159 and has four positions which are clutch, neutral, brake, and jog. The outlets 146 and 147 are connected to conduits 160 and 161.

The conduits 160 and 161 are connected to fluid openings 168 and 169 in the friction mechanism 16. This friction mechanism 16 includes a hydraulic servomotor 170 which is shown as a cylinder 171 and a piston 172 therein. The fluid openings 168 and 169 go to opposite sides of this piston 172. The piston 172 is operatively connected to the input shaft 19 of the gear transmission 15. Connected to the shaft 19 are rotary clutch disks 173 and rotary brake disks 174. The rotary clutch disks 173 are designed to frictionally engage clutch disks 175 driven by the pulley 13. The rotary brake disks 174 are adapted to frictionally engage the brake disks 176 which are carried by a stationary part of the frame of the lathe. The clutch disks 175 are splined for axial movement inside of the pulley 13 and the clutch disks 173 are splined for axial movement on the end of piston 173. Thus, when the piston moves to the left the disks 173 and 175 are pressed together in a stack on the inside wall of the pulley 17 to provide clutching action on both faces of both disks 173 and 175. In similar manner brake disks 174 and 176 are splined on their respective members 19 and 18 to stack up for braking action when piston 172 moves to the right. The friction mechanism 16 is shown in the neutral position with the piston 172 centered in the cylinder 171. If fluid flows into the opening 169, then the piston 172 will be moved toward the left and hence the clutch disks 173 and 175 will be frictionally engaged so that the motor 12 will drive the input shaft 19 of the transmission 15. If fluid is admitted to the opening 168, then the piston 172 will be moved to the right and hence the input shaft 19 will be braked because of the action of the brake disks 174 and 176.

A jog valve 37 is supplied with fluid from the conduit 35, and is connected by a conduit 180 to the jog mechanism 26. The jog valve 37 includes a valve spool 38 and a spring 39 to urge this spool to the right. The jog mechanism 26 is adapted to supply jogging power to the transmission 15.

The variable restriction valve 48 operates to linearly increase the pressure applied to the friction mechanism 16 through the drive control valve 131. As the drive control lever 30 is moved from the neutral position to either the clutch or brake position, the fork 57 will act through the ball 58 to depress the piston 74. The spring 75 will thus be compressed in a manner which is essentially linear since the lever 30 rotates through only a small arc. Further the fork 57 or 59 may have curved surfaces to assure a linear compression of the spring 75. In the normal position the spring 75 is just slightly compressed because of fluid flow through the restricted orifice 100 to the chamber underneath the land 84. The pressure underneath this land 84 will tend to raise the valve spool 50 against the urging of the spring 75. As the spring 75 is compressed due to the action of the lever 30, the land portion 83 will gradually cut off the flow of oil from the inlet 76 to the outlet 77. This will increase the pressure in the conduits 35 and 101. An alternate construction would be the elimination of land 84, since the function of this land and the restricted orifice 100 is to act as a dashpot for smoother action. This hydraulic system of obtaining linearly increasing clutch pressure is a considerable improvement over mechanical systems of levers and linkages because the ordinary system of mechanical lever has a powerful toggle to be overcome which is completely independent of clutch pressure, and is greatest at the very end of throw of the lever. In this instant case the operator can "feel" the pressure which he is applying to the clutch or the brake as the case may be. There is no powerful toggle to overcome, and hence the only pressure which the operator feels is that which directly acts upon the clutch or brake. Thus the hydraulic control system of the instant invention is a considerable improvement over the mechanical system for providing variable clutch or brake pressure.

An operator of the control system 24 may control the clutch 17 or brake 18 by the hydraulic servomotor 170, and this servomotor is controlled by the drive control lever 30. As this lever is moved toward the clutch position, the valve spool 133 will be moved toward the right. This will permit fluid to flow from the inlet 130 to the outlet 147, and hence through the conduit 161 to the fluid opening 169. The fluid pressure available at the inlet 130, and hence at the friction mechanism 16, is of course dependent on the compression of the spring 75. Fluid pressure on the right side of the piston 172 will urge this piston to the left to engage the clutch disks 173 and 175. Since the motor 12 is assumed to be running, the torque from this motor will be passed to the input shaft 19 of the gear transmission 15. During movement of the piston 172, fluid from the left side of this piston will exit through the conduit 160 to the outlet 146 of the drive control valve 131. From here, it will pass through the outlet passageway 157 to the main outlet 154. It will then go through the outlet conduit 155 to the lubrication system 156.

If the drive control lever 30 is moved from the neutral position to the brake position, then the valve spool 133 will be moved to the left. This will cause fluid to be directed from the inlet 130 to the outlet 146, the conduit 160, and the fluid opening 168. This will cause the piston 172 to move to the right and hence the brake disks 174 and 176 will be engaged so that the input shaft 19 is braked to a stop. Fluid from the right side of the piston 172 exits through the conduit 161, the outlet 147, the main outlet 154 to the outlet conduit 155. This exit passageway for the hydraulic fluid is in effect for most of the movement of the lever 30 toward the brake position. It will be noted that the fourth land 137 will close off the main outlet 154 at the end of movement of the lever 30. Fluid will then pass through the restricted orifice 158 to the main outlet 154.

The hydraulic detent mechanism which includes the chambers 139 and 144 and the restricted orifices 152 and 153 operate to hold the drive control valve 131 in either the clutch or the brake position. Assuming that the lever 30 is moved toward the clutch position, the fluid under linearly increasing pressure will initially enter the inlet 130 and it will also enter the detent inlets 148 and 149 to escape to the lubrication system 156 through the orifices 152 and 153. It will therefore be seen that initially the forces caused by the fluid pressure are equalized, and hence there is no unbalanced axial force on the valve spool 133. As the valve spool 133 is moved toward the right, the land 138 will gradually cover the detent inlet 149. As this detent inlet is covered, the pressure inside the chamber 144 will lessen because of the increased restriction at the inlet 149. At the same time the land 134 is moving to the right, and hence is not covering the detent inlet 148. Thus the fluid pressure in the chamber 139 will remain substantially constant. As the inlet 149 is covered, there will be an unbalanced axial force on the spool 133 to urge it toward the right, and hence the spool 133 will remain in the clutch position even though the operator lets go of the lever 30. There is assumed to be some mechanical stop which prevents the valve spool 133 from going beyond that position shown for the clutch position of the lever 30.

If the lever 30 is moved from the neutral position toward the brake position, essentially the same form of hydraulic detent mechanism is employed. The land 134 will gradually cut off the flow of fluid through the inlet 148, and hence as this flow is nearly cut off, or completely cut off, there will be an unbalanced axial force on the valve spool 133 because of the higher pressure in the chamber 144 than in the chamber 139. The valve spool 133 will thus be urged to the left to be held in a position corresponding to the brake position of the lever 30. Since there is a jog position for the valve spool 133 which is still further to the left than is the brake position, the spool 133 of the drive control valve 131 will engage the spool 38 of the jog valve 37, and hence this will provide a physical stop or a cushioned stop for the spool 133 to hold the lever 30, in the brake position. If the operator wishes the jog mechanism, he must push the lever 30 to the jog position against the urging of the spring 39.

When the drive control lever 30 is moved to the jog position, the valve spool 133 will also be moved still further to the left from the position during the brake condition. When the lever 30 is in the brake position, the land 134 will be just covering the detent inlet 148. As this valve spool is moved still further toward the left, that is toward the jog position, then fluid from the conduit 101 will enter the detent inlet 148 and go into the outlet passageway 157 to the fourth chamber 142. This will permit fluid under pressure to go into the conduit 161 to the right side of the piston 172. Thus the pressure on both sides of the piston 172 will be equalized and hence the brake 18 and clutch 17 will be disengaged so that the jog mechanism 26 may pulsatingly drive the gear transmission 15. It will thus be seen that the chambers 139 and 144 together with the restricted orifices 152 and 153 constitute a form of hydraulic detent which is simple and foolproof, has no moving parts to wear, and has no mechanical toggle to overcome. Since there is no mechanical toggle, there is no false "feel" given to the operator and hence the linearly increasing compression of the spring 75 is a direct and true indication to the operator of the amount of clutch or brake pressure actually being applied.

The hydraulic detent mechanism has been shown as constructed on the drive control valve 131. However, this detent mechanism holds both drive control valve and the variable restriction valve 48 in the selected position. The detent mechanism has been described as a two-way detent. That is, it holds the valve mechanism in either the clutch or brake position. It could easily be constructed as a one-way detent mechanism should this be so desired. Further either the one-way or two-way detent mechanism could be constructed as a part of the variable restriction valve 48. The detent mechanism as shown as part of the drive control valve 131 has an added feature which is the use of a smaller force than the force of the compression spring 75 simply because the leverage is greater in the linkage to the drive control valve 131. It will be seen that the distance between the pivots 145 and 159 is greater than the lever arm distance through which the force of the spring 75 acts. Because of this increased leverage in the connection to the drive control valve 131, the differential force in the detent chambers 139 and 144 need only establish a torque about the pivot 159 which is in opposition to and greater than the torque established by the force of the compression spring 75.

Although this invention has been described in its preferred form with a certain degree of particularly, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A hydraulic pressure control circuit for a fluid pressure utilization device, said circuit comprising first and second valves, said first valve having a valve body and a movable valve member therein, a land on said member defining with said body a chamber, an inlet and an outlet in said body adapted to communicate with said chamber, a surface on said land adjacent said outlet, a spring disposed to urge said valve member in a given direction to effect a closing of said outlet by said surface, said inlet adapted to be connected to a source of pressure fluid and said outlet adapted to be connected to a receptor having a low back pressure relative to the pressure of said source, a branch line connected to said inlet, said second valve including a valve body and a movable valve member therein, inlet means on said second valve body connected to said branch line, first and second outlets on said second valve body for connection to said utilization device, land means on said second valve member being movable to alternative positions for directing alternatively the fluid to said first and second outlets, said second valve body having first and second walls, said land means on said second valve member being disposed near said first wall, said land means forming first and second chambers with said first and second walls, said land means having equal areas opposing the associated walls, first and second restricted outlets from said first and second chambers, respectively, said inlet means of said second valve adapted to communicate with said first and second chambers, an operating lever, means for connecting said lever to said first valve spring, and means for connecting said lever to said second valve member, said second valve member being movable by said lever a given distance so as to close the inlet means to said first chamber to a degree establishing a given lowered fluid pressure in said first chamber, said given lowered pressure establishing a differential pressure in said first and second chambers and hence a differential force on said second valve member, the movement of said lever by said given distance exerting a force on said first valve spring to raise the pressure in said branch line, said differential force acting on said lever establishing a torque greater than and in opposition to the torque established by the force of said first valve spring acting on said lever to thus hold said lever at said given distance.

References Cited in the file of this patent

UNITED STATES PATENTS

| | | |
|---|---|---|
| 265,178 | Swank | Sept. 26, 1882 |
| 1,842,725 | Link | Jan. 26, 1932 |
| 1,927,700 | Dickinson | Sept. 29, 1933 |
| 2,243,364 | Trautman | May 27, 1941 |
| 2,344,768 | Dodson | Mar. 21, 1944 |
| 2,392,421 | Stephens | Jan. 8, 1946 |
| 2,424,806 | Eaton | July 29, 1947 |
| 2,526,709 | Tait | Oct. 24, 1950 |
| 2,527,943 | Lee | Oct. 31, 1950 |
| 2,547,254 | Braithwaite | Apr. 3, 1951 |
| 2,552,848 | Gabriel et al. | May 15, 1951 |
| 2,617,389 | Munschauer | Nov. 11, 1952 |